F. L. KING.
Machinery for Dressing Stone.

No. 158,175. Patented Dec. 29, 1874.

5 Sheets--Sheet 1.

Witnesses:
C. G. Keyes
Geo. E. Farnum

Inventor:
Francis L. King

F. L. KING.
Machinery for Dressing Stone.

No. 158,175. Patented Dec. 29, 1874.

5 Sheets--Sheet 2.

Witnesses:
C. G. Keyes
Geo. E. Farrury

Inventor:
Francis L King

5 Sheets--Sheet 4.
F. L. KING.
Machinery for Dressing Stone.
No. 158,175. Patented Dec. 29, 1874.
Fig 4.     Fig 5.     Fig 6.     Fig 7.
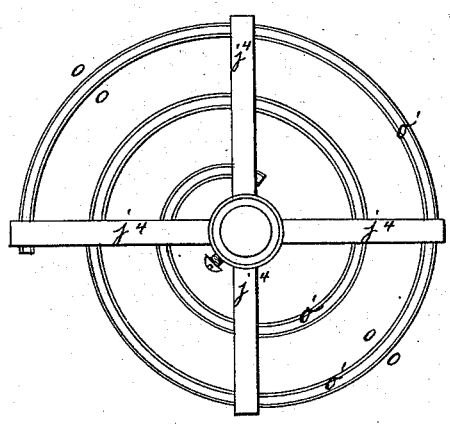 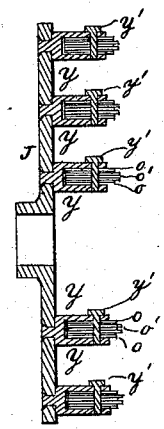 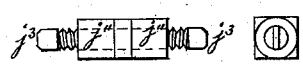
Fig 8.
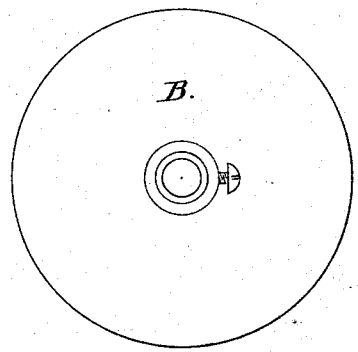
Fig 11.     Fig 10.     Fig 9.
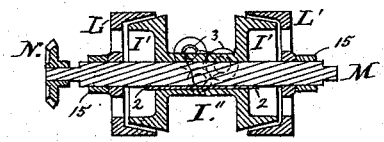 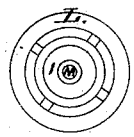 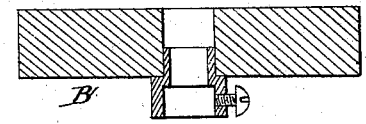
Witnesses:
C. G. Keyes
Geo. E. Fanning
Inventor:
Francis L. King 5 Sheets--Sheet 5.
F. L. KING.
Machinery for Dressing Stone.
No. 158,175. Patented Dec. 29, 1874.
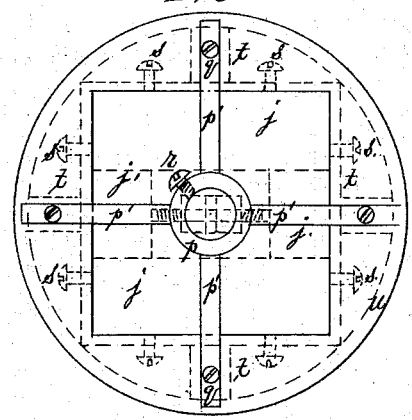
Fig. 12.
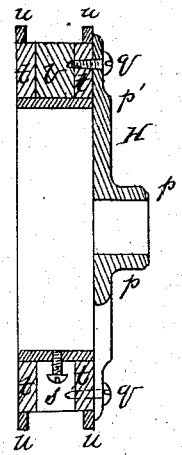
Fig. 13.
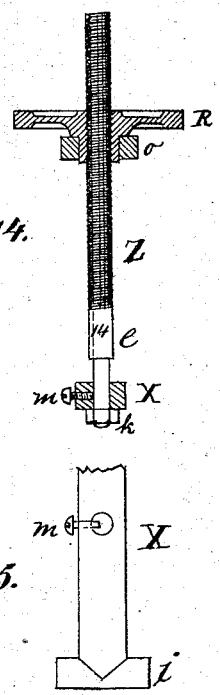
Fig. 14.
Fig. 15.
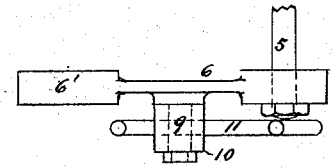
Fig. 16.
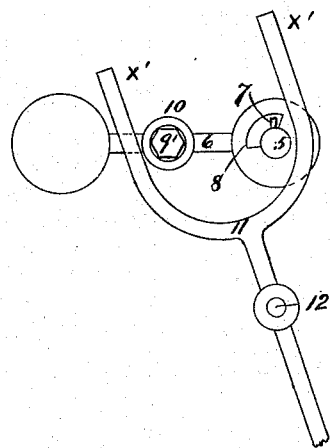
Fig. 17.
Witnesses:
C. G. Keyes
Geo. E. Farnum
Inventor:
Francis L. King

UNITED STATES PATENT OFFICE.

FRANCIS L. KING, OF BOSTON, MASSACHUSETTS, ASSIGNOR TO EDDY L. KING, OF SAME PLACE.

IMPROVEMENT IN MACHINERY FOR DRESSING STONE.

Specification forming part of Letters Patent No. 158,175, dated December 29, 1874; application filed October 20, 1869.

*To all whom it may concern:*

Be it known that I, FRANCIS L. KING, of the city of Boston, in the county of Suffolk, in the State of Massachusetts, have invented certain Improvements in Machinery for Dressing Stone, and other analogous material, of which the following is a specification:

The object of this invention is the construction of a machine whereby stone can be faced, dressed, and polished without removal from the machine; and it consists in the construction of the parts of the machine, and their combination and arrangement with relation to other parts, as will be more fully described hereinafter.

Figure 1:
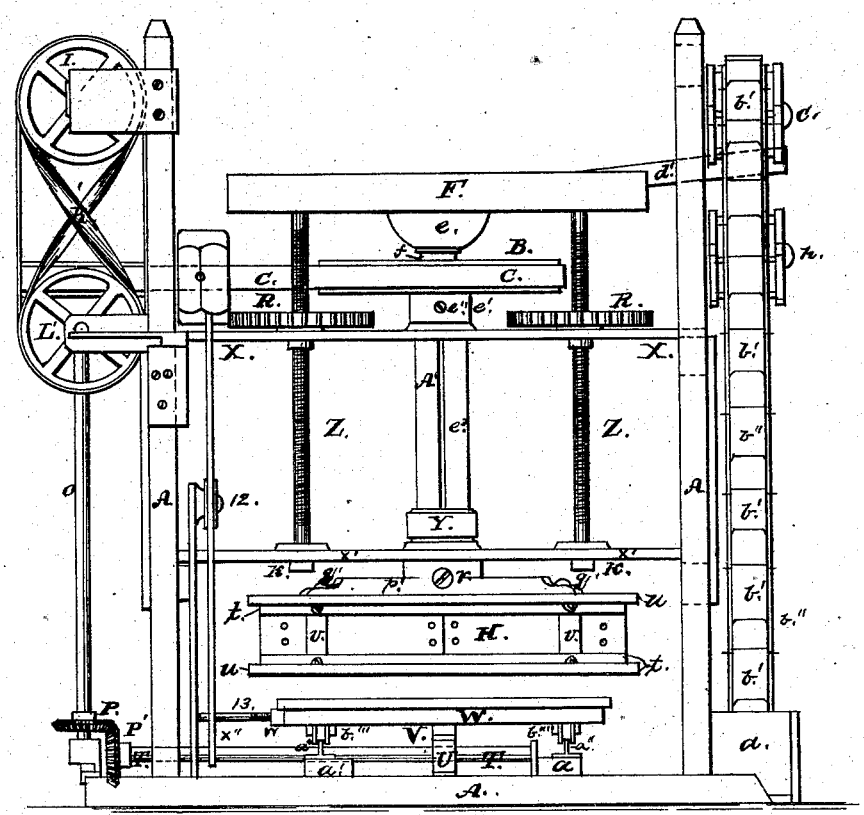
Figure 2:
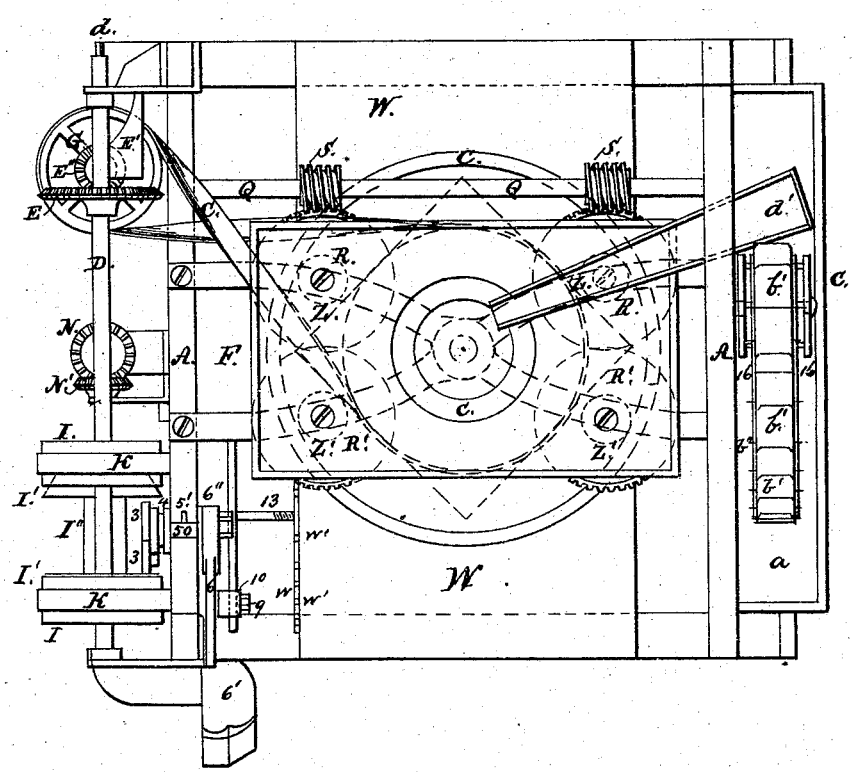
Figure 3:
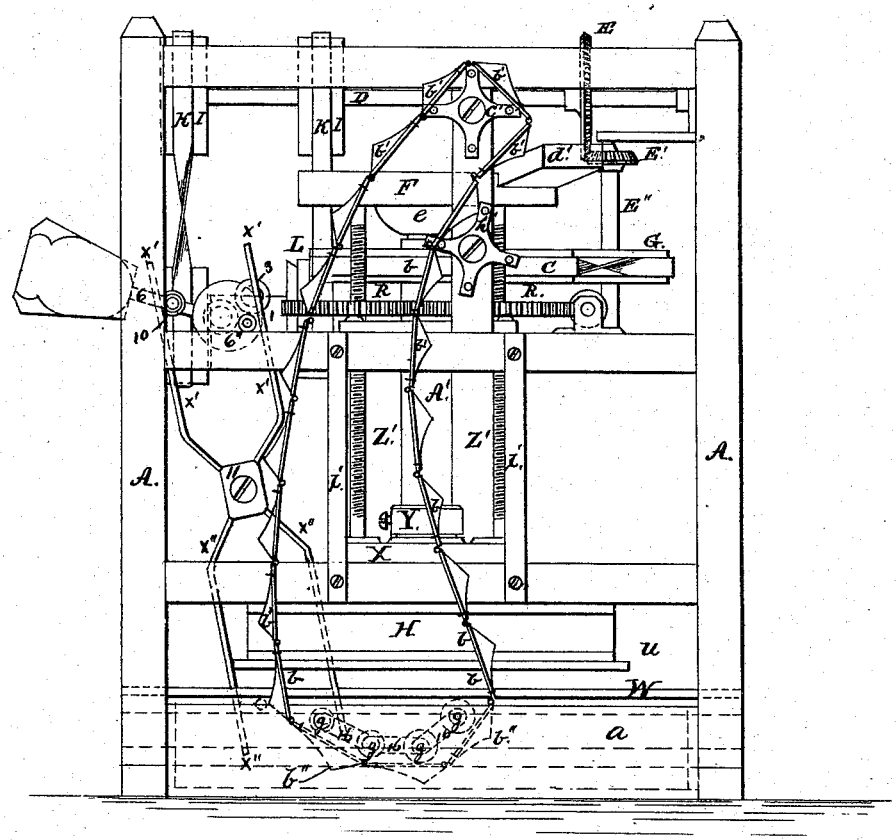

In the drawings, Figure 1 is an end elevation of the machine. Fig. 2 is a plan view. Fig. 3 is a side elevation. Fig. 4 is a plan or top view of a polisher. Fig. 5 is a sectional view of same. Fig. 6 is a longitudinal view of a clamp-screw to clamp the stone in the chuck or holder; Fig. 7, an end view of same. Fig. 8 is a plan view of a grinder or polisher. Fig. 9 is a sectional view of the same. Fig. 10 is an end view of a hollow friction-pulley. Fig. 11 is a longitudinal sectional view of same and friction-wheels. Fig. 12 is a plan view of the revolving stone chuck or holder. Fig. 13 is a sectional view of same. Fig. 14 is a sectional view of one of the adjusting and hoisting screws. Fig. 15 is an end view of an arm of the adjustable frame; Figs. 16 and 17, details of a shipping device for reversing the reciprocations of the carriage and stone thereon.

A represents the frame-work of the machine; or the operating machinery can be attached to the frame of a building, as may be desired, instead of a separate frame. D is a horizontal shaft, to which the power is applied at $d$, and upon which is gear-wheel E, gearing into its mate wheel E′ on upright shaft E″. I I are two pulleys, placed at the proper distance apart, and made fast on shaft D, and revolve with it. L and L′ are hollow friction-pulleys, revolving freely on the horizontal shaft M, turned beveling or flaring upon their inner openings. Shaft M has a longitudinal spline, 2, laid in a groove made to receive it in said shaft M. I′I′ are friction cone-pulleys on hollow shaft or sleeve I″, which sleeve has on its inner bore, that surrounds shaft M, a groove large enough to receive and freely reciprocate on the spline 2 in shaft M, and will cause shaft M to revolve in either direction with the sleeve I″ or cone friction-pulleys I′I′. K is a belt or band going around one of the pulleys I and around one of the hollow friction-pulleys L, and will revolve pulley L in one direction. K′ is a belt around the other pulley I, and is crossed before it goes around pulley L′, and will consequently turn this pulley L′ in a contrary direction to what pulley L is revolved. Upon the inner end of shaft M is a bevel-gear wheel, N, gearing into its mate gear-wheel N′ on upright shaft O, at the lower end of which is bevel-gear wheel P, gearing into its fellow bevel-wheel P′ on horizontal shaft T, which shaft T has, at the proper point, fixed upon it a toothed pinion-wheel, U, that revolves with the said shaft T, whether the shaft be revolved in one direction or the other. $a'$ $a'$ are sills for sustaining the tracks $a''$ $a''$, which extend across the machine, and upon which the wheels $b'''$, underneath of and attached to the reciprocating carriage or platform W, travel. V is a toothed rack, fast on the under side of the carriage W, and gears into pinion U on shaft T. $w$ is a gage-plate secured to one side of carriage W, and has any desired number of holes $w'$ for receiving the tripping-pin 13, as said pin can be changed into any one of them when desired. 11 is a shifting-lever for reversing the movement of the carriage; is pivoted at 12 and bifurcated, or has double arms $x'$ $x'$ at one end, and $x''$ $x''$ at the other end. 10 is a friction-roller pivoted to the arm of a weighted lever, 6, at 9, against which one or the other of the arms $x'$ will bear, unless the weighted lever 6 is in or nearly in a perpendicular position, while the tripping-pin 13 on the reciprocating carriage W will, in the reciprocations of the carriage, strike against and carry along with it either one or the other of the arms $x''$ of the lever 11.

The weighted lever 6, with its weight 6′, is attached to shaft 5 by the hub 6″, which hub has a round bore through it to receive the said shaft 5. On one side of hub 6″ is a quadrantal slot, 8, (seen in Fig. 17,) which slot is concentric with the bore in the hub, and extends a quarter or more of the distance around the shaft 5, and fast in shaft 5 is a pin or lug, 7, which allows the weighted lever to describe one-quarter or one-third of a full circle without moving shaft 5, and by which means a sudden stop of the reciprocating carriage is avoided. Projecting from, and fast in, shaft 5 are stop-pins 5', which, as the shaft 5 is turned in either direction, strike upon and against the top of the frame, and prevents the said shaft 5 from turning too far, as the weighted lever 6 is turned over from one side to the other in reversing the movement of the carriage W. 4 is a triangular plate made fast upon the end of shaft 5 at one of its angles, and to the other two angles friction-wheels 3 3 are pivoted.

By forcing lever 11 in either direction one of the arms $x'$ will strike the friction-wheel 10, and force the weighted lever 6 to be raised into a perpendicular position, and finally beyond the perpendicular, so that it will fall over to the opposite side. In doing so the shaft 5 is revolved partly around, and with it the triangular plate 4, with friction-wheels 3 3, which will bring one of said friction-wheels 3 to bear against and force one of the pulleys I' within and in close contact with the angular opening in pulley L, which will then be revolved and give direction to the revolution of shaft M; but when lever 11 is forced at its bottom end to go in the opposite direction it reverses the movement by carrying the weighted lever over to the other side, and forcing the other friction-wheel 3 hard against the other friction cone-pulley I' within the hollow pulley L', when shaft M will be reversed in its revolution, and reciprocate the carriage W in the opposite direction.

Upon shaft D, and revolving with it, is a gear-wheel, E, which gears into its mate wheel E' on upright shaft E''. G is a pulley on upright shaft E'', having a band or belt, C, going around it. B is a band-pulley, fast upon a hollow shaft, A', and with which it revolves by means of the belt C, which is around and crosses between pulleys G and B, and can be adjusted to any desired height on the shaft A' by means of the set screw $e''$, which passes through a collar or hub, $e'$, to which the radial arms of the pulley are attached, and the end of the screw enters a longitudinal groove, $e^3$, in the hollow shaft A', which prevents the band-wheel B from turning upon the hollow shaft A'. H is a chuck for holding stone, both to be dressed and polished, as well as to dress and polish stone placed underneath it, and formed within the tires $u$ $u$ by segmental sides $t$ $t$ $t$ $t$ and their supports $v$, leaving an opening in the center of the chuck of a quadrangular form. This chuck may, however, be made entirely of metal when desired; but however made, the stones $j$ $j$ and $j'$ $j'$ are placed within the quadrangular opening, as seen in dotted lines in Fig. 12.

The stones $j$ are held in position by means of the set-screws $s$ $s$, which pass through the sides of the chuck H, and bear on opposite sides of the stone and clamp it fast in the chuck.

While stones $j'$ $j'$ are shorter than $j$, and fill the space between them, they are held in place and clamped in the chuck by the double screw-clamp seen in Fig. 6, composed of the nut $j''$ $j''$ and right and left hand clamp-screws $j^3$ $j^3$, one projecting from opposite sides of the nut $j''$, and when placed between the stones $j'$ the screws $j^3$ can be turned to project outward from the nut $j''$, their outer ends bearing against the stones $j'$, and clamping them firmly against the opposite sides of the chuck H. $p$ is a hub, having radial arms $p'$, and to which the chuck H is firmly attached by means of the screws $q$ $q$.

The chuck H, containing the stones $j$ and $j'$, is held fast upon the hollow revolving shaft A' by a holding-screw which passes through the hub $p$, enters the groove $e^3$ in shaft A', which prevents the chuck from turning upon and compels it to revolve with the shaft A', while it can be adjusted to any height on said shaft A' to accommodate the thickness of the stone to be dressed. W is a reciprocating carriage, with wheels traveling upon ways, and carrying a stone to be dressed, which reciprocates with the carriage. Q is a horizontal shaft running from opposite sides of the machine, and upon which are worm-wheels S S, that gear into wheels R R, and revolve them around on screw-rods Z Z. R' R' are gear-wheels, with the same diameter and number of teeth that wheels R have, and are on upright screw-rods Z' Z', and gear into wheels R R. Screw-rods Z are cut with a right-hand thread, while screw-rods Z' have a left-hand thread; or they may be reversed in this order, if necessary, and have the left-hand screw cut on rods Z, and the right-hand thread upon rods Z'. X is a fixed frame secured to the framing in a secure manner, has a central opening to receive and guide the revolving hollow shaft A', and holes to allow the free passage through it of the screw-rods Z and Z'. X' is an adjustable sliding frame, similar in form to frame X, and situated below it, the ends of which enter grooves $i$ in the upright side bearings, and by which it is guided in its vertical adjustment. Rods Z and Z' go through and are made fast to frame X', so that as the wheels R and R' are revolved they will elevate or depress the frame X'. Y is an adjustable collar around hollow shaft A', and bears upon the thimble around the center hole in frame X', to admit the hollow shaft A'. F is a floor secured to the upper ends of screw-rods Z and Z', and by which it may be adjusted in height as circumstances require. This floor will also protect the gear-wheels, screws, and revolving shaft below it from sand and grit that may fall from the feeding of sand between the stones to be dressed. $d'$ is a chute or spout to direct the sand used in dressing the stone into hopper $e$ in floor F, when the sand passes down through tube $f$ inside of the hollow shaft A', and falls between the stone in the chuck H and stone on the reciprocating carriage W. $c$ is a carrier-wheel, to be driven by any power, and constructed to receive and carry, as it revolves, the sand-elevator. $b$ is the chain to which the buckets $b'$ are attached, is made of wire, and so connected to the buckets $b'$ that a bucket is attached to each link of the chain, and the links of the chain to be adapted to the wheel by which it is revolved. The buckets $b'$ have in their front sides a projection, $b''$, which extends outward farther than the sides, and compels the buckets to fill as each one is revolved in the sand-reservoir. $h$ is a guide-wheel, similar in construction to wheel $c$, is placed vertically underneath wheel $c$, or nearly so, and is for the purpose of deflecting the elevator from a perpendicular position, in order to insure the delivery of the contents of the bucket into the chute $d'$, and turn it away from contact with the side of the said chute, and prevent catching thereon, and only turns as the elevator travels. $g$ is a guide-roller fixed in the top part of a sand-reservoir, and freely revolves on its axis. 16 16 16 are loose connecting-arms, one pair of which are pivoted around the axle to guide-roller $g$, and then at the other end receive another weight-roller, $g'$, which revolves, but can rise and fall. To the first roller, $g'$, is connected another set of arms, which, in turn, at their outer ends, are connected to the second weight-roller, $g'$, and so on to any number desired, which, when so put together, form a flexible weight, bearing upon the top side of the elevator when in the sand-reservoir, to compel it at all times to fill with sand, as by this means the elevator is prevented from making so short a curve as it would without these weighted and connected rollers $g'$, and, in filling with sand, describe a much larger circle, and hence in a position to fill. $a$ is the sand-reservoir, containing sand or other material for dressing stone, and in which the elevator is forced to travel and fill its buckets with sand to be deposited in the chute $d'$. J is a polishing-wheel, and is interchangeable with the chuck-wheel H on the hollow shaft A', and is made with a hub or eye to go onto the hollow shaft A', and be held by a holding-screw. The hub or eye has four radial arms, $j^4$, of different lengths. Upon the under side of these arms $j^4$, and projecting downward, are slotted lugs $y$, as seen in Fig. 5. $o\ o$ are metal plates with several thicknesses of cloth, $o'$, folded between them, and the edge of the fold extends or drops a little distance below the lower edge of the metal plates $o$; and as thus arranged, the edge of the polisher is placed in the slots of the lugs, bent in scroll form, as seen in Fig. 4, and secured therein by means of the bolt or screw $y'$ going through the lugs, metal plates, and cloth, as seen in Fig. 5. B', Figs. 8 and 9, represents a polisher, that is interchangeable with the chuck H on hollow shaft A', and is used when there is no small stone to dress with stone in the chuck, and may be made of any suitable composition for the purpose.

When the machine is thus constructed, and the stone placed in the chuck H, and other stone or stones upon the reciprocating carriage W, and secured in position, power is applied to revolve shaft D, which gives motion to the hollow pulleys L and L', and, by the close contact of one of the friction cone-pulleys I', shaft M is revolved, which, through its gear-wheel and mate, revolves the upright shaft O and horizontal shaft T, having pinion U thereon, gearing into rack V on the under side of the carriage W, which causes it to reciprocate in one direction until the trip-pin 13 strikes one leg, X'', of the bifurcated lever 11 and carries it along; and as it vibrates, one of the upper forks, X', will strike the friction-wheel 10 on weighted lever 6, and force it upward until it falls to the opposite side, when the opposite cone-pulley I' is forced in contact with the other hollow pulley running in a contrary direction, when the reverse motion will be given to the intermediate wheels and shafts, and cause a reverse reciprocation of the carriage W. At the same time chuck H is revolved by means of the belt C from pulley G, around band-wheel B, which will give a revolving motion in a horizontal direction to the stone in the chuck, while the stone on the carriage will have a reciprocating movement, and a rotary motion is given to wheel $c$, which causes the sand-elevator to revolve and fill its buckets or sand-carriers with sand or other sharp stone-cutting material placed in the reservoir $a$, when the sand is elevated, poured into the spout $d'$, and thence into hopper $e$ and tube $f$, and is delivered between the reciprocating stone upon carriage W and the stone in the revolving chuck, which will quickly and truly dress the surfaces of the stone in the chuck and the stone on the reciprocating carriage. After the stone on the carriage W is dressed to a true and even surface, it can be polished by removing the chuck and putting in its place the polisher J, which is, as heretofore described, made of cloth, felt, or some suitable fibrous material, the edge of which is brought into contact with the face of the reciprocating stone on carriage W, the fiber sweeping off the loose particles of stone, and, carrying more or less of them within its fiber and in contact with the stone, soon brings a fine smooth polish upon the stone on the reciprocating carriage.

This polisher, being put into its frame J in the form of a scroll, will not fail to sweep and come in contact with every particle of the surface of the stone, and in an eccentric manner, and the open spaces between the curves of the scroll will serve to keep the fiber of the polisher from being clogged with dust, and greatly facilitate the operation of polishing, and prevent the polisher from jumping.

The movement of the chuck by revolving in a horizontal direction and carrying stone therein to be dressed, in conjunction with a stone that reciprocates backward and forward, is believed to be new, and gives the greatest and best satisfaction in practice.

The chuck and polisher can be adjusted at any time higher or lower by revolving the shaft Q and the train of wheels R and R' on the screw-rods Z and Z', attached to frame X'.

Having thus described my invention, what I claim, and desire to secure by Letters Patent, is—

1. The combination of the chuck H with the right and left hand screw-clamp $j'' j''$ and $j^3 j^3$, for the purpose substantially as described.

2. The scroll-polisher J, constructed in the manner and for the purpose substantially as described.

3. The combination of the revolving wheel $c$, guide-wheel $h$, the sand-elevator, composed of chain $b$, buckets $b'$, having the extension-lip $b''$, and revolving pulley $g$, in the manner and for the purpose described.

4. The combination of the revolving pulley $g$, pulleys $g' g' g'$, connected together and to the axis of pulley $g$ by the links or plates 16, with the sand-elevator, in the manner and for the purpose described.

5. The adjustable trip-pin 13 in the reciprocating carriage W, in combination with the pivoted bifurcated lever 11, weighted lever 6, having friction-roller 10, shaft 5, pins 5', triangular plate 4, friction-wheels 3, friction cone-pulleys I', sleeve I'', and hollow pulleys L and L', and train of moving wheels and shafts, in the manner and for the purpose described.

6. The pin 7 in shaft 5, in combination with the quadrantal slot 8 and weighted lever 6, in the manner and for the purpose described.

7. The combination of the adjustable frame X', adjustable collar Y, hollow shaft A', and adjustable band-wheel B, in the manner described.

8. The machine for dressing stone herein described, and composed of a horizontally-revolving chuck or polisher, a reciprocating carriage with the stone to be polished thereon, the reversing movement to the reciprocating carriage, the flexible weighted sand-elevator and sand-feeding device, and the adjustable frame for raising or lowering the revolving chuck, substantially as herein described and shown.

FRANCIS L. KING.

Witnesses:
C. G. KEYES,
GEO. E. FARNUM.